Sept. 24, 1957  J. R. J. VAN DONGEN  2,807,156
SEPARATION PROCESS
Filed Dec. 13, 1954
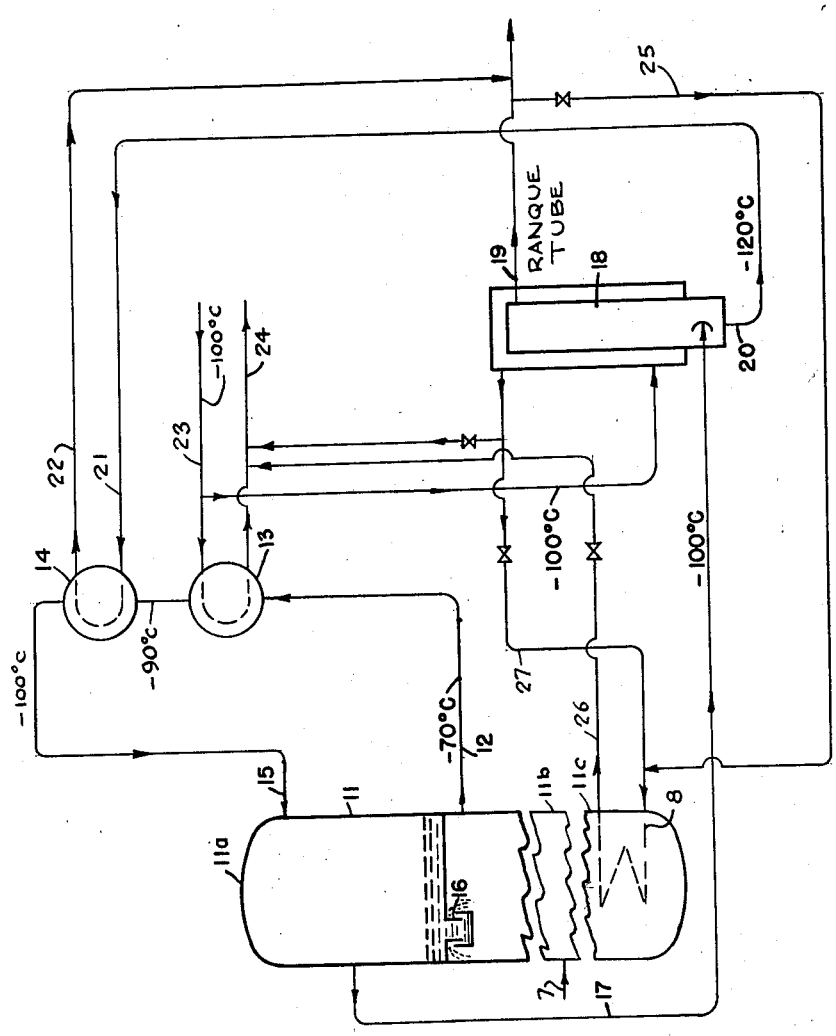
INVENTOR:
JAN ROELOF JOHAN VAN DONGEN
BY John H. Colvin
HIS AGENT

2,807,156
SEPARATION PROCESS

Jan Roelof Johan van Dongen, The Hague, Netherlands, assignor to Shell Development Company, New York, N. Y., a corporation of Delaware Application December 13, 1954, Serial No. 474,935

Claims priority, application Netherlands December 16, 1953

12 Claims. (Cl. 62—175.5)

This invention relates to an improved distillation process for the separation of mixtures of vaporous substances. More particularly, the invention relates to an improved distillation process for the separation of mixtures comprising low molecular weight hydrocarbons.

It is well-known to separate mixtures of low molecular weight hydrocarbons, such as refinery cracked gases which may result from catalytic and thermal cracking operations in the production of motor fuels or from the catalytic or thermal dehydrogenation processes effected to produce lower olefins, by various fractionation processes, including low temperature and high pressure fractional distillation, rectified absorption and selective adsorption separation. In order to effect these separations, it is generally necessary to supply heat to one portion of the separation zone and to remove heat (supply cold) to another portion of the separation zone. For instance, in a fractional distillation the fractionating column(s) may be provided with reboiling means in the lower part thereof and reflux in the upper part is provided by a cooling coil placed in the top of the column or by an external condenser with return of a part of the condensate as reflux.

Although such indicated processes are utilized on a large commercial scale, such as in the recovery of ethylene, ethane and propylene from cracked hydrocarbon gas streams, and although various improvements as related to such operations have been proposed heretofore, it has not been found to be economical to carry out the desired separations with the sharpness which is required to effect the maximum recovery of the desired components in the required purities.

It is, therefore, a principal object of this invention to provide an improved process for the separation of mixtures of vaporous materials. A more specific object is to provide an improved distillation process for the separation of normally gaseous hydrocarbons. A still more specific object is to provide an improved process for the more complete separation between the methane and ethylene in a mixture of low molecular weight hydrocarbons, which may also contain hydrogen. These objects will be better understood and other objects will become apparent from the description of the invention which will be made with reference to the accompanying drawing, forming a part of this specification, wherein:

The sole figure is a schematic diagram of a system for a separation by distillation according to the present invention.

Now, in accordance with the present invention, there is provided a process for the separation of a mixture of vaporous substances at a relatively high pressure, wherein the mixture to be separated is fractionated at a high pressure in a fractionation zone into a vapor phase and a condensed phase, while supplying any required heat near the bottom thereof and supplying cold near the top thereof, expanding at least a portion of the separated vapor phase in a vortex tube and withdrawing therefrom a vapor stream at a lower temperature and utilizing the cold thereof to provide at least a portion of the cold supplied to the upper part of the fractionation zone.

In accordance with a preferred operation of the invention the total cooling effect made available in the cool stream withdrawn from the vortex tube is materially increased by maintaining in contact with the outside of the wall of the vortex tube, particularly the hot end thereof, a heat transfer medium also at a temperature at least about as low as the temperature of the stream as it is fed to the vortex tube. This cooling stream or medium is advantageously a separated stream of one of the components of the initial mixture to be separated. Furthermore, it is preferably a feed component identical with the component in the overhead vapor stream which it is desired to recover more completely in the liquid phase.

In accordance with one aspect of the invention, heat is withdrawn simultaneously from the vortex tube and at least a portion of it is utilized as reboiling means in the fractionation zone. This heat which is withdrawn from the vortex tube may be suitably withdrawn in a portion of the vapor stream or it may be, and preferably is, transferred through the wall of the vortex tube to a heat transfer medium, as already indicated, in contact with the outside of the wall and transferred by the heat transfer medium to the zone of heat requirement.

By a vortex tube is meant what has also been called a Ranque tube or a Hilsch tube or a "hot-cold pipe." The so-called vortex tube appears to have been discovered first by Georges J. Ranque, the construction and some of the operating features of such a tube being described in U. S. Patent 1,952,281, issued March 27, 1934 to Ranque. A bibliography of publications on the vortex tube has been published by W. Curley and R. MacGee, Jr., in Refrigerating Engineering, vol. 59, 1951, pages 166 and 191–193.

As set forth in the aforementioned patent and the prior art referred to in the mentioned bibliography, the vortex tube may include a chamber having the shape of a surface of revolution, such as a cylinder, this chamber having an inlet pipe for tangentially introducing the gas to be treated into a central region of the chamber. A gyratory motion is imparted to the gas as it enters the chamber, and means, such as a restricted orifice between one end of the cylinder and the tangential inlet, are provided to divide the gas into two concentric sheets moving along each other so that the outer sheet is compressed by the inner sheet. The work thus produced causes a substantial rise in temperature in the outer sheet and a corresponding drop in the temperature of the inner sheet.

The present invention is especially applicable to the separation of a mixture of very low boiling substances, as the separation generally has to be carried out at high pressures, and low temperatures have to be employed in the top of the column in order to cause the reflux required for the separation. The invention is particularly applicable, for example, in the separation of methane and hydrogen from a mixture thereof with $C_2$- and $C_3$-hydrocarbons; in the separation of ethylene from ethane; and in the separation of the components of air.

In the practice of the invention, the top gases of the distillation unit are preferably first cooled by means of a coolant in a first stage and already partly condensed if possible; the gases (if desired together with the condensate) are then further cooled indirectly in a second stage by means of the cold generated in the vortex tube in another operation; the condensate is wholly or partly used as reflux for the distillation and the remaining gases are expanded in the vortex tube in the other operation already referred to, the cold thereby generated being employed for the further cooling already mentioned. The cold gases expanded in the vortex tube are effectively brought for the purpose into heat exchange with the said gases and any condensate already formed; this condensate may, however, be previously separated. It will be understood that it is not necessary that the gases should be expanded in a single vortex tube; a number of vortex tubes may be connected in parallel and/or in series. Connection in series may be effected in such a way that the cold gas partly expanded in a vortex tube is further expanded in a following vortex tube. Expansion can proceed until atmospheric or any other suitable pressure is reached.

Particularly advantageous results are obtained in the practice of the invention by using a vortex tube which—at least at the place where the heat separation effect occurs—(i. e. the effect occurring when the gases expand in a vortex tube, by which the peripheral gas is heated and the central gas is cooled) is empty and intensively cooled. Cooling is intensive if—when approximately 15 to 20% of the gas introduced is drawn off from the vortex tube as hot gas—the absolute temperature of the hot gas is not more than approximately 15% and preferably not more than 3% higher than the absolute temperature of the gas introduced.

This cooling is effected by providing the vortex tube with a cooling jacket through which flows a suitable coolant. By employing such a tube in the distillation separation process of the invention, a portion of the same coolant used in cooling the top gases in the first stage may be employed to advantage for cooling the vortex tube. In the practice of the present invention, a particularly suitable coolant is a liquid product of one of the components of the gaseous mixture to be separated and the temperature of which has been adjusted to be at least about as low as the temperature of the overhead stream prior to cooling and partial condensation thereof for the production of reflux.

If it is desired to generate the optimum amount of cold, as would be represented by the maximum for the product of the fraction of gas issuing from the cold end times the difference in temperature between the entering gas and that which exists the cold end, between approximately 10 and 30%, preferably approximately 20%, say 15–25%, of the gas should be drawn off on the hot side.

The length of the empty, i. e., unobstructed, part of the vortex tube should be preferably at least three to four times the diameter of the tube if gas is discharged on the hot side, and at least six times the diameter of the tube if this is not the case. Moreover, it is advisable for the empty part of the vortex tube to be 10 to 20 or more times the diameter of the tube.

Having described in general how the present invention is to be practiced, a more detailed description of its application in a particular embodiment thereof will be made as an aid to a more complete understanding of it.

Referring to the sole figure of the drawing, it shows diagrammatically the top of a distillation column 11 with intermediate section 11b and feed line 7 and bottom section 11c with heating coil 8, a so-called demethanizer, utilized in the separation by distillation of the components lighter than ethane and ethylene, namely, methane and hydrogen, as well as small quantities of carbon monoxide and nitrogen, from a mixture of cracked gases produced for the recovery of ethylene, together with auxiliary condensers, separator, and vortex cooling tube, i. e., Ranque tube, for the practice of the invention. The remainder of the total separation unit, for the separation and recovery of ethylene, ethane, propylene, etc., comprises a more or less conventional low temperature fractionation unit for such separations. For the purpose of completeness, reference is made to Petroleum Refiner, vol. 31, No. 9, September 1952, pages 250–251, for a description of a typical such low temperature fractionation process for the production of ethylene. It is to be seen that the refrigeration and reboiling requirements are provided, as is well-known to those familiar with the art, by an integrated cascade refrigeration system utilizing ethylene and propane as heat transfer media. The ethylene in the refrigeration system is supplied as a portion of the ethylene product of the separation. The general manner in which one or more of the refrigerants in such systems may be utilized to absorb heat from an overhead stream, in the refrigeration, and to transfer that heat to another portion of the distillation zone, for instance as reboiling means, is clearly set forth in the prior art; see, for example, U. S. Patent 2,214,790. Referring to column 11 of the figure, in the particular operation now referred to, it operates under a pressure of approximately 38 atmospheres absolute; the temperature at the top of the column at the place where the top gases are discharged through line 12 is −70° C. One hundred ninety tons of mixture a day is fed into the approximate center of the column; the column is provided with reboiling in the usual way; the bottom temperature is approximately +30° C. and approximately 130 tons of liquid bottom product is produced daily.

The top gases pass successively, via a line 12, through two heat exchangers 13 and 14, in which they are cooled and partly condensed. Condensate and remaining gases are recycled via line 15 into the top 11a of column 11. This part acts as a separator in which the condensate is separated from the remaining gases. The condensate flows through a discharge pipe 16 into the distillation column, where it forms the reflux required for distillation, while the remaining gases leave the separator 11a via line 17.

The general object of the present invention is to use the latent energy present in gases derived from the distillation unit operating under superatmospheric pressure in order to generate cold by allowing them to expand in a vortex tube which is preferably a cooled one. According to the invention the remaining gases which are discharged via line 17 are now enabled to expand in a cooled vortex tube 18. Approximately 60 tons of gases, consisting mainly of methane and hydrogen, with a small proportion of ethylene, pass daily through the vortex tube 18, where they expand from approximately 38 atmospheres absolute to approximately 7 atmospheres absolute. The vortex tube 18 has the following dimensions:

|  | cm. |
|---|---|
| Internal diameter | 2.8 |
| Length | 135 |
| Diameter of discharge opening for cold gases | 1.7 |

The tube is entirely empty, i. e., unobstructed, and intensively cooled, i. e. by a portion of the same coolant as that used to cool the top gases in the heat exchanger 13. Approximately 15% of the gas is withdrawn from the vortex tube at the hot end 19, by which means the maximum cold-generating capacity of the tube is reached. The cold gases discharged on the cold side 20 of the vortex tube are led via line 21 to the heat exchanger 14 and are there brought into counterflow heat exchange with the gases and the condensate from the heat exchanger 13. The spent gases leave the heat exchanger by line 22.

The coolant which flows through the heat exchanger 13 and the cooling jacket of the vortex tube 18, consists of ethylene of −100° C. This coolant is supplied through line 23 and drawn off through line 24. The cold gases issuing from the vortex tube have a temperature of approximately −120° C.

The gases withdrawn at 19 may be discharged together with the gases from line 22.

The top gases are cooled in the heat exchanger 13 from −70° C. to −90° C. and the gases together with the condensate formed are subsequently cooled to −100° C. in the heat exchanger 14. This temperature also prevails in the separator 11a.

By applying the process according to the invention, by means of which the latent energy of the gases drawn off is more effectively used, the top temperature of the distillation column is reduced from −90° C. (without employing a vortex tube) to −100° C.; as a result the ethylene content in the residual gases is reduced from 5½ mol percent to from 1 to 1½ mol per cent. This means that approximately 1000 tons more of ethylene a year is produced than was formerly the case.

In some applications of the invention at least a portion of the reboiling heat supplied to the bottom of the distillation zone 11 can be provided by the hotter stream of vapor issuing from the hot end of the vortex tube, as shown by valved line 25 to coil 8 and return valved line 26, and/or by the heated external coolant from the cooling jacket of the vortex tube, as shown by valved line 27 to coil 8 and return valved line 26.

The foregoing description of the application of the present invention to a commercial scale operation has demonstrated the utility and advantages of the invention in the recovery of ethylene from a mixture of low molecular weight hydrocarbons containing methane and ethylene, in addition to the other substances which are usually found in streams processed for the recovery of ethylene. However, the advantages of the invention are not limited to this particular separation. It is also useful in the separation of ethane and higher hydrocarbons from a natural gas stream containing such hydrocarbons, even though in relatively small proportions, in admixture with methane. It is also contemplated to utilize the invention in the separation of such mixtures as hydrogen and methane, and nitrogen and oxygen.

I claim as my invention:

1. A process for the separation of a mixture of low boiling vaporous substances comprising distillation of the mixture in a distillation zone at superatmospheric pressure into an overhead vapor stream and a bottoms liquid stream while supplying required heat to a lower portion of the distillation zone, expanding at least a portion of the separated vapor stream in a vortex tube and withdrawing therefrom only a portion of it as a vapor stream at a reduced temperature, the remainder being withdrawn as a separate vapor stream at a higher temperature, and transferring cold from the reduced-temperature stream to the upper part of the distillation zone.

2. A process according to claim 1, wherein heat is withdrawn simultaneously in a fluid medium from the vortex tube and at least a portion of the thus-heated fluid medium is utilized as reboiling means in the distillation zone.

3. A process according to claim 1, wherein the vortex tube is cooled by heat exchange against a coolant at a temperature at least about as low as the vapor stream delivered to the vortex tube.

4. A process according to claim 1, wherein the vortex tube is cooled by heat exchange against a coolant at a temperature at least about as low as the vapor stream delivered to the vortex tube and the coolant consists essentially of a separated one of the substances in the mixture to be separated.

5. A process according to claim 3, wherein the vortex tube is unobstructed where the heat separation effect thereof occurs and it is intensively cooled by the coolant.

6. A process according to claim 5, wherein the cooling is so intensive that the withdrawal from the hot side of the vortex tube of from 15 to 20% of the gas introduced is hot gas at an absolute temperature not more than about 15% higher than the absolute temperature of the gas introduced.

7. A process according to claim 5, wherein from 10 to 30% of the gas introduced is withdrawn from the hot side of the vortex tube.

8. A process for separating methane from ethylene of a mixture of low-boiling hydrocarbons containing them, which comprises: distilling the mixture in a distillation zone at superatmospheric pressure into an overhead vapor stream consisting essentially of methane and a small proportion of ethylene and a bottoms liquid stream, while supplying required heat to a lower portion of the distillation zone and supplying cold through reflux near the top of the distillation zone; cooling the overhead vapor in a first stage by heat exchange with a coolant therefor; further cooling the resulting partially cooled overhead stream in a second stage by heat exchange against a cold stream produced in a vortex tube as defined hereinafter; separating and utilizing resulting condensate from the cooled overhead stream as reflux for the distillation and expanding remaining vapors in a vortex tube and thereby generating a cold gas stream which is utilized as the cold stream in the further cooling step described hereinbefore.

9. A process according to claim 8, wherein the vortex tube is cooled by heat exchange against a further portion of the same coolant used in the first stage cooling of the overhead stream.

10. A process according to claim 9, wherein the coolant is ethylene.

11. A process according to claim 10, wherein the coolant is a product of the separation process and is utilized at a temperature lower than the temperature of the overhead vapor stream and essentially at the temperature of the remaining vapors delivered to the vortex tube.

12. A process according to claim 11, wherein the heat transferred from the vortex tube to the coolant is utilized to supply reboiling heat in the separation process.

References Cited in the file of this patent

UNITED STATES PATENTS

| 2,134,700 | Brewster | Nov. 1, 1938 |
| 2,571,329 | Berg | Oct. 16, 1951 |